(12) United States Patent
Harper

(10) Patent No.: US 10,395,682 B2
(45) Date of Patent: *Aug. 27, 2019

(54) ACHIEVING FINE MOTION BETWEEN MODULES IN A MAGNETIC HEAD

(71) Applicant: International Business Machines Corporation, Armonk, NY (US)

(72) Inventor: David H. F. Harper, Vail, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/802,344

(22) Filed: Nov. 2, 2017

(65) Prior Publication Data

US 2018/0122412 A1 May 3, 2018

Related U.S. Application Data

(63) Continuation of application No. 15/336,641, filed on Oct. 27, 2016, now Pat. No. 9,892,751.

(51) Int. Cl.
*G11B 5/584* (2006.01)
*G11B 5/265* (2006.01)
(Continued)

(52) U.S. Cl.
CPC .......... *G11B 5/584* (2013.01); *G11B 5/00817* (2013.01); *G11B 5/265* (2013.01);
(Continued)

(58) Field of Classification Search
None
See application file for complete search history.

(56) References Cited

U.S. PATENT DOCUMENTS 5,021,906 A 6/1991 Chang et al.
5,636,088 A 6/1997 Yamamoto et al.
(Continued)

FOREIGN PATENT DOCUMENTS

WO 2010044784 A1 4/2010

OTHER PUBLICATIONS

Wang et al., "Approaches to Tilted Magnetic Recording for Extremely High Areal Density," IEEE Transactions of Magnetics, vol. 39, No. 4, 2003, pp. 1930-1935.

(Continued)

*Primary Examiner* — Craig A. Renner
(74) *Attorney, Agent, or Firm* — Zilka-Kotab, P.C.

(57) ABSTRACT

An apparatus, according to one embodiment, includes: a first module and a second module each having an array of transducers oriented orthogonal to an intended direction of tape travel thereacross, where the first module is movable relative to the second module. The apparatus also includes an actuator configured to exert a force on one of the modules for causing a relative movement of the first module with respect to the second module for aligning the transducers of the first module with the transducers of the second module in a direction of tape travel thereacross. Moreover, longitudinal axes of the arrays of the first and second modules are not pivotable from orthogonal to the intended direction of tape travel thereacross. Other systems, methods, and computer program products are described in additional embodiments.

17 Claims, 10 Drawing Sheets

(51) Int. Cl.
*G11B 5/29* (2006.01)
*G11B 5/008* (2006.01)
*G11B 5/48* (2006.01)

(52) U.S. Cl.
CPC .............. *G11B 5/29* (2013.01); *G11B 5/4893* (2013.01); *G11B 5/00826* (2013.01)

(56) References Cited

U.S. PATENT DOCUMENTS

| | | | |
|---|---|---|---|
| 5,982,592 | A | 11/1999 | Saito et al. |
| 6,222,698 | B1 | 4/2001 | Barndt et al. |
| 6,246,552 | B1 | 6/2001 | Soeno et al. |
| 6,611,399 | B1 | 8/2003 | Mei et al. |
| 6,757,128 | B2 | 6/2004 | Yip |
| 6,771,456 | B2 | 8/2004 | Winarski et al. |
| 7,054,097 | B1 | 5/2006 | Yip et al. |
| 7,068,473 | B2 | 6/2006 | O'Neill |
| 7,239,465 | B1 | 7/2007 | Watson et al. |
| 7,301,724 | B2 | 11/2007 | Brittenham |
| 7,342,738 | B1 | 3/2008 | Anderson et al. |
| 7,359,160 | B2 | 4/2008 | Koga et al. |
| 7,393,066 | B2 | 7/2008 | Dugas et al. |
| 7,474,495 | B2 | 1/2009 | Weng et al. |
| 7,486,464 | B2 | 2/2009 | Saliba |
| 7,505,221 | B2 | 3/2009 | Watson |
| 7,529,060 | B2 | 5/2009 | Simmons, Jr. et al. |
| 7,738,212 | B2 | 6/2010 | Saliba et al. |
| 7,764,460 | B2 | 7/2010 | Bates et al. |
| 8,144,424 | B2 | 3/2012 | Dugas et al. |
| 8,184,394 | B2 | 5/2012 | Poorman et al. |
| 8,310,778 | B2 | 11/2012 | Biskeborn et al. |
| 8,773,810 | B2 | 7/2014 | Biskeborn et al. |
| 8,804,270 | B2 | 8/2014 | Hamidi et al. |
| 9,892,751 | B1 | 2/2018 | Harper |
| 2003/0227702 | A1 | 12/2003 | Watson et al. |
| 2004/0109261 | A1 | 6/2004 | Dugas |
| 2005/0259364 | A1 | 11/2005 | Yip |
| 2006/0126212 | A1 | 6/2006 | Anderson et al. |
| 2008/0158720 | A1* | 7/2008 | Watson .................. G11B 5/584 360/77.12 |
| 2008/0186610 | A1 | 8/2008 | Bui et al. |
| 2008/0218891 | A1 | 9/2008 | Gubbins et al. |
| 2008/0239559 | A1 | 10/2008 | Goker et al. |
| 2010/0067139 | A1 | 3/2010 | Bates et al. |
| 2010/0214688 | A1 | 8/2010 | Biskeborn et al. |
| 2011/0141604 | A1 | 6/2011 | Dugas et al. |
| 2012/0188665 | A1 | 7/2012 | Biskeborn et al. |
| 2012/0206832 | A1 | 8/2012 | Hamidi et al. |

OTHER PUBLICATIONS

Lim et al., "Perpendicular Magnetic Recording Process Using Finite-Element Micromagnetic Simulation," IEEE Transactions on Magnetics, vol. 42, No. 10, 2006, pp. 3213-3215.
Biskeborn et al., U.S. Appl. No. 13/010,731, filed Jan. 20, 2011.
Hamidi et al., U.S. Appl. No. 13/026,142, filed Feb. 11, 2011.
Biskeborn et al., U.S. Appl. No. 15/273,508, filed Sep. 22, 2016.
Harper D., U.S. Appl. No. 15/336,641, filed Oct. 27, 2016.
Final Office Action from U.S. Appl. No. 15/336,641, dated Jul. 7, 2017.
Non-Final Office Action from U.S. Appl. No. 15/336,641, dated Dec. 23, 2016.
Notice of Allowance from U.S. Appl. No. 15/336,641, dated Sep. 29, 2017.
Supplemental Notice of Allowance from U.S. Appl. No. 15/336,641, dated Dec. 12, 2017.

* cited by examiner

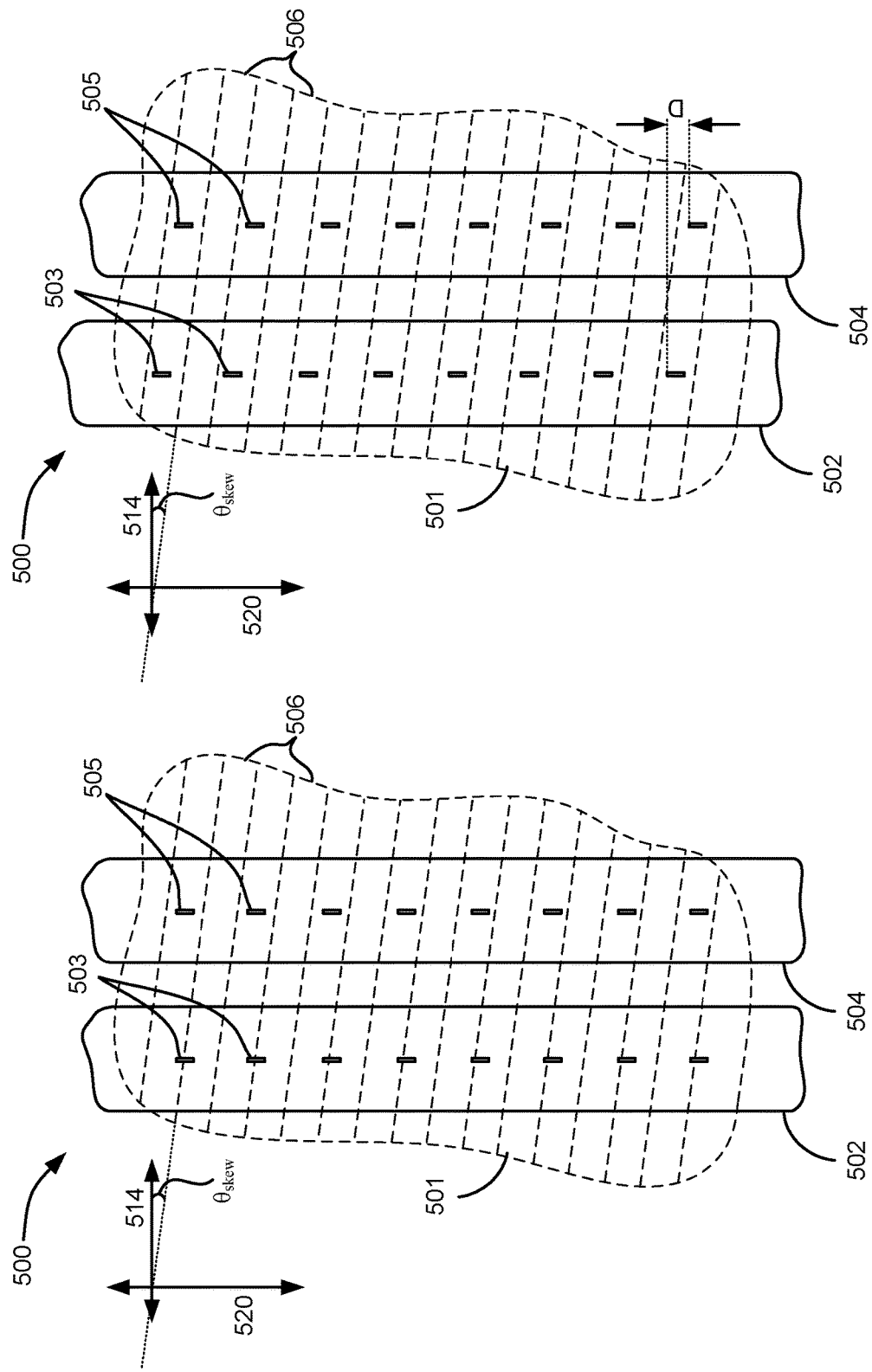

ACHIEVING FINE MOTION BETWEEN MODULES IN A MAGNETIC HEAD

BACKGROUND

The present invention relates to data storage systems, and more particularly, this invention relates to a tape-based data storage system having an actuator configuration for tape skew compensation.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

The quantity of data stored on a magnetic tape may be expanded by increasing the number of data tracks across the tape. More tracks are made possible by reducing feature sizes of the readers and writers, such as by using thin-film fabrication techniques and magnetoresistive (MR) sensors. However, for various reasons, the feature sizes of readers and writers cannot be arbitrarily reduced, and so factors such as tape skew, lateral tape motion (e.g., perpendicular to the direction of tape travel), transients and tape lateral expansion and contraction must be balanced with reader/writer sizes that provide acceptable written tracks and readback signals.

One issue limiting areal density is misregistration caused by tape skew. As tape is being run over the surface of a tape head, angular shifts in the relative angular relationship between an array of transducers and the data tracks on the tape may occur. Accordingly, data may not be readable from a tape, particularly as the tape capacity increases over time and tracks become smaller.

SUMMARY

An apparatus, according to one embodiment, includes: a first module and a second module each having an array of transducers oriented orthogonal to an intended direction of tape travel thereacross, where the first module is movable relative to the second module. The apparatus also includes an actuator configured to exert a force on one of the modules for causing a relative movement of the first module with respect to the second module for aligning the transducers of the first module with the transducers of the second module in a direction of tape travel thereacross. Moreover, longitudinal axes of the arrays of the first and second modules are not pivotable from orthogonal to the intended direction of tape travel thereacross.

A computer-implemented method, according to another embodiment, includes: determining an extent of tape skew relative to transducers for reading and/or writing to a magnetic tape, the transducers being positioned in arrays on first, second and third modules of a magnetic head, and changing a state of a first actuator in response to the determined extent of the skew for causing a relative movement of the modules for aligning the transducers of the modules to compensate for the tape skew. The third module is positioned on an opposite side of the first module relative to the second module, and the second and third modules are fixed relative to each other. Furthermore, longitudinal axes of the arrays of the modules are not pivotable from orthogonal to an intended direction of tape travel thereacross.

A computer program product, according to yet another embodiment, includes a computer readable storage medium having program instructions embodied therewith. The computer readable storage medium is not a transitory signal per se. Moreover, the program instructions are readable and/or executable by a processor to cause the processor to perform a method which includes: determining, by the processor, an extent of tape skew relative to transducers for reading and/or writing to a magnetic tape, the transducers being positioned in arrays on first, second and third modules of a magnetic head; and changing, by the processor, a state of a first actuator in response to the determined extent of the skew for causing a relative movement of the modules for aligning the transducers of the modules to compensate for the tape skew. The third module is positioned on an opposite side of the first module relative to the second module, and the second and third modules are fixed relative to each other. Furthermore, longitudinal axes of the arrays of the modules are not pivotable from orthogonal to an intended direction of tape travel thereacross.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 5A-5B are representative drawings showing the effects that implementing lateral shifts between modules has on tape skew.

DETAILED DESCRIPTION

Figure 1:
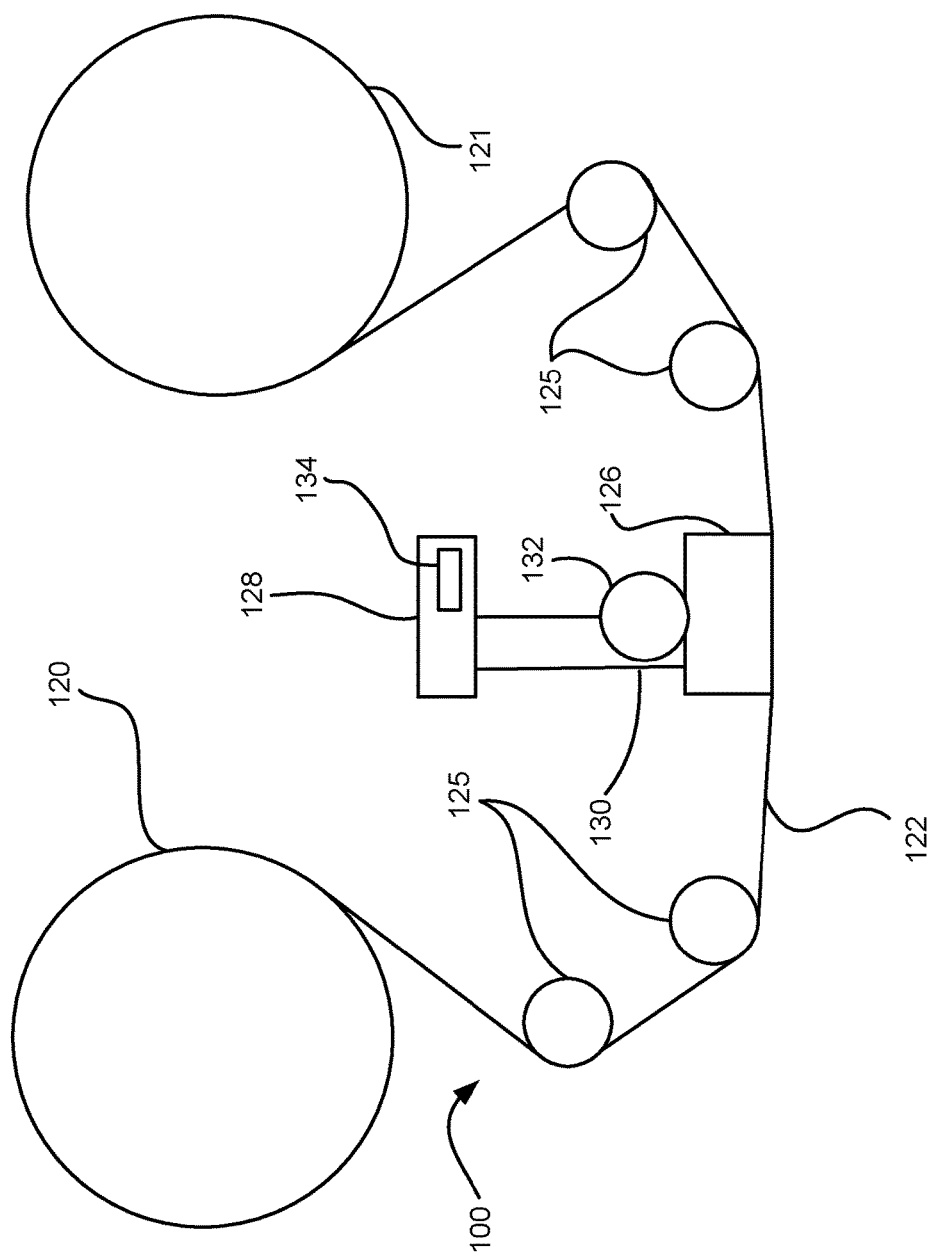
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having actuator configurations for improved tape skew compensation, as well as operation and/or component parts thereof. Various embodiments described herein may be able to achieve selective relative fine motion between arrays of transducers of a magnetic head in a cross-track direction, as will be described in further detail below.

In one general embodiment, an apparatus includes a first module and a second module each having an array of transducers oriented orthogonal to an intended direction of tape travel thereacross, and an actuator configured to exert a force on one of the modules for causing a relative movement of the first module with respect to the second module for aligning the transducers of the first module with the transducers of the second module in a direction of tape travel thereacross. The first module is movable relative to the second module. Moreover, longitudinal axes of the arrays of the first and second modules are not pivotable from orthogonal to the intended direction of tape travel thereacross.

In another general embodiment, a system includes: a first module and a second module each having an array of transducers, a third module positioned on an opposite side of the first module relative to the second module, the third module having an array of transducers. The first module is movable relative to the second module. The system also includes a first piezoelectric actuator coupling a first end of the first module to the second and/or third modules, and a second piezoelectric actuator coupling a second end of the first module to the second and/or third modules. The second end of the first module is opposite the first end of the first module along a longitudinal axis of the first module, while the first and second piezoelectric actuators are configured to exert a force on the second and/or third modules for causing a relative movement of the first module with respect to the second and third modules for aligning the transducers of the first module with the transducers of the second and/or third modules in an intended direction of tape travel thereacross. Furthermore, the system includes a controller configured to control the first and second piezoelectric actuators to compensate for tape skew based on a readback signal of the tape.

In yet another general embodiment, a computer-implemented method includes: determining an extent of tape skew relative to transducers for reading and/or writing to a magnetic tape, the transducers being positioned in arrays on three modules of a magnetic head, and changing a state of an actuator in response to the determined extent of the skew for causing a relative movement of the modules for aligning the transducers of the modules to compensate for the tape skew. A third module is positioned on an opposite side of a first module relative to a second module, and the second and third modules are fixed relative to each other.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
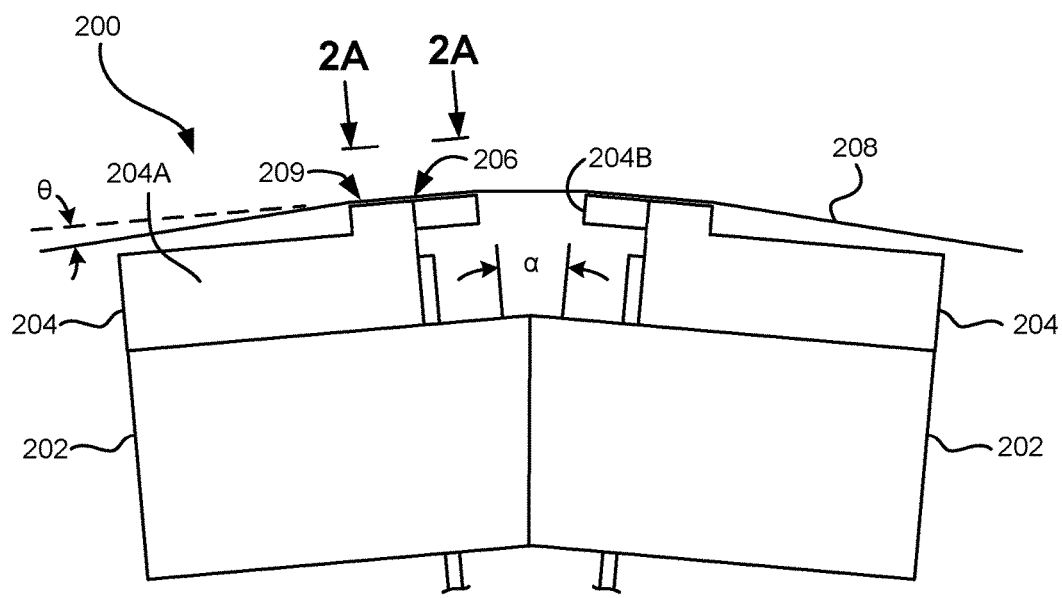
FIG. 2 illustrates a side view of a flat-lapped, bi-directional, two-module magnetic tape head.

By way of example of operation of a tape drive, FIG. 2 illustrates a side view of a flat-lapped, bi-directional, two-module magnetic tape head 200 which is provided for explanatory purposes to show general principles of a tape-based data storage system. Note that in various embodiments of the present invention, other configurations may be used, which themselves may include components similar to and/or different than those shown in FIG. 2, as will become apparent to one skilled in the art upon reading the present specification and viewing the appended drawings. As shown, the head includes a pair of modules, each comprised of a base 202, bonded to a chiplet 204. Each chiplet 204 includes a substrate 204A and a closure 204B with a thin film portion, commonly referred to as a "gap" in which the readers and/or writers 206 are formed. The bases are typically "U-beams" which provide space for a cable in the center and allow adhesive bonding near the edges of the U. The U-Beam bases are bonded together at a small angle α with respect to each other. After bonding the two modules form a single physical unit to provide read-while-write capability by activating the writer of the leading module and reader of the trailing module aligned with the writer of the leading module parallel to the direction of tape travel relative thereto. In use, a tape 208 is moved over the chiplets 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

In generally, the readers on one module are aligned with the writers on the opposite module, such that a data patterns written by one module can subsequently be read by the second module as the tape moves thereacross. The readers and writers in one module may be arranged in a piggyback configuration. The readers and writers may also be arranged in an interleaved configuration. Alternatively, each array of channels may be readers or writers only. Any of these arrays may contain one or more servo readers.

Figure 2A:
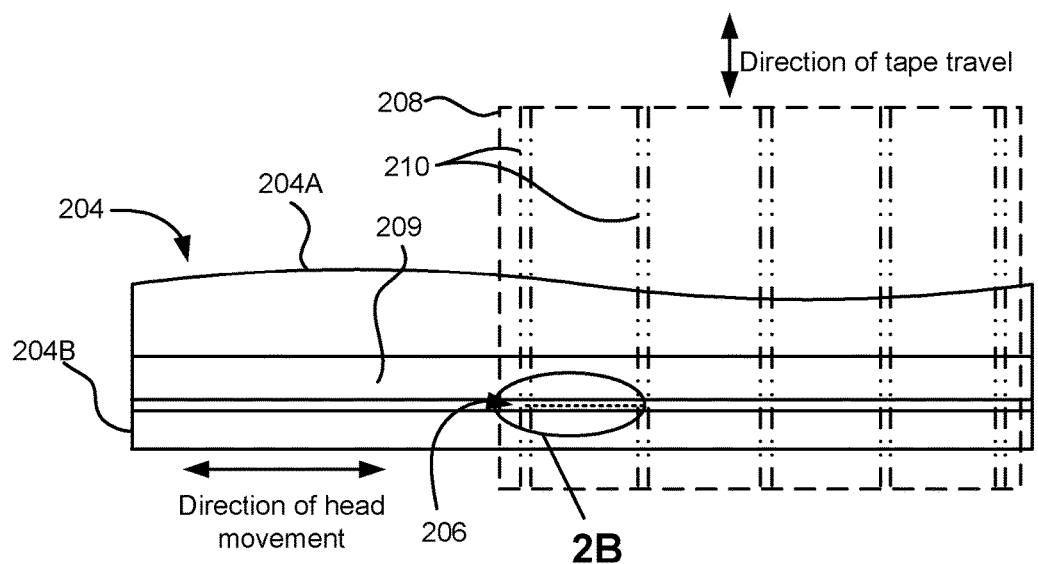
FIG. 2A is a tape bearing surface view taken from Line 2A of FIG. 2.

FIG. 2A illustrates the tape bearing surface 209 of one of the chiplets 204 taken from Line 2A of FIG. 2. A representative tape 208 is shown in dashed lines. The chiplet 204 is preferably long enough to be able to support the tape as the head steps between data bands.

In this example, the tape 208 includes 4 data bands, e.g., with 4 data bands and 5 servo tracks 210, as shown in FIG. 2A on a one-half inch wide tape 208. The data bands are defined between servo tracks 210. Each data band may include a number of data tracks, for example 96 data tracks (not shown). During read/write operations, the readers and/or writers 206 are positioned within one of the data bands. Outer readers, sometimes called servo readers, read the servo tracks 210. The servo signals are in turn used to keep the readers and/or writers 206 aligned with a particular track during the read/write operations.

Figure 2B:
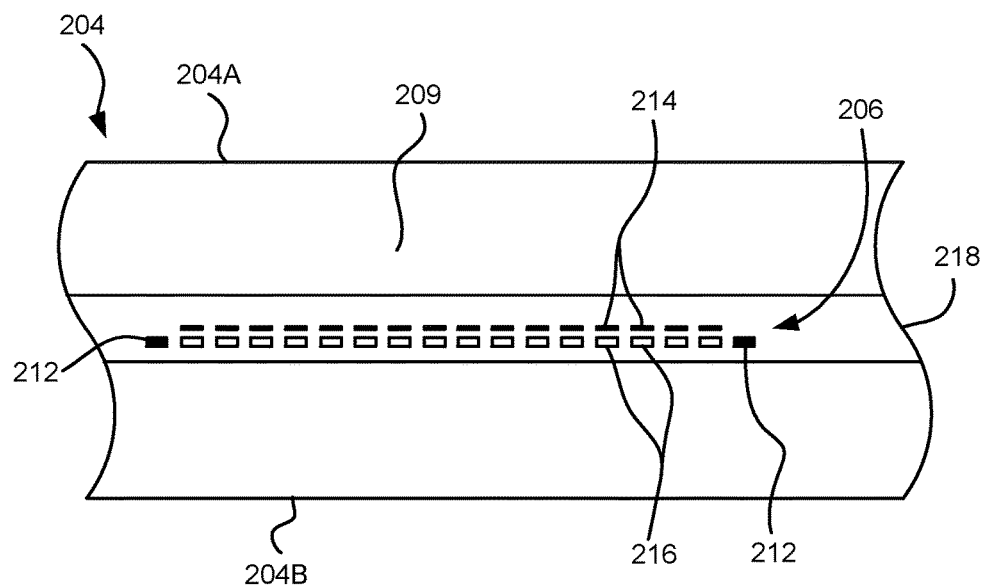
FIG. 2B is a detailed view taken from Circle 2B of FIG. 2A.

FIG. 2B depicts a plurality of readers and/or writers 206 formed in a gap 218 on the chiplet 204 in Circle 2B of FIG. 2A. As shown, the array of readers and writers 206 includes, for example, 16 writers 214, 16 readers 216 and two servo readers 212, though the number of elements may vary. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each chiplet 204 may include a complementary set of readers and/or writers 206 for such things as bi-directional reading and writing, read-while-write capability, backward compatibility, etc.

Figure 2C:
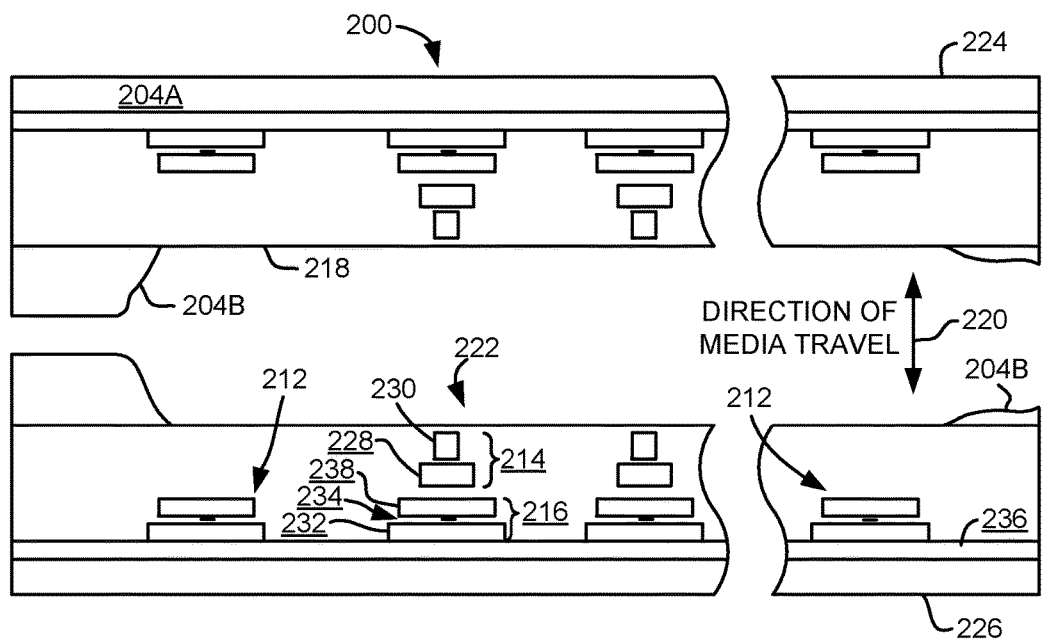
FIG. 2C is a detailed view of a partial tape bearing surface of a pair of modules.

FIG. 2C shows a partial tape bearing surface view of complimentary modules of a magnetic tape head 200. Each module has a plurality of read/write (R/W) transducer pairs in a piggyback configuration formed on a common substrate 204A and an optional electrically insulative layer 236. The writers on one module, exemplified by the writer 214 and the readers on the opposite module, exemplified by the read head 216, are aligned across from each other such that they are parallel to a direction of travel of a tape medium thereacross to form an R/W pair, exemplified by the R/W pair 222. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 in this example includes two thin-film modules 224 and 226 of generally identical construction.

When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3B:
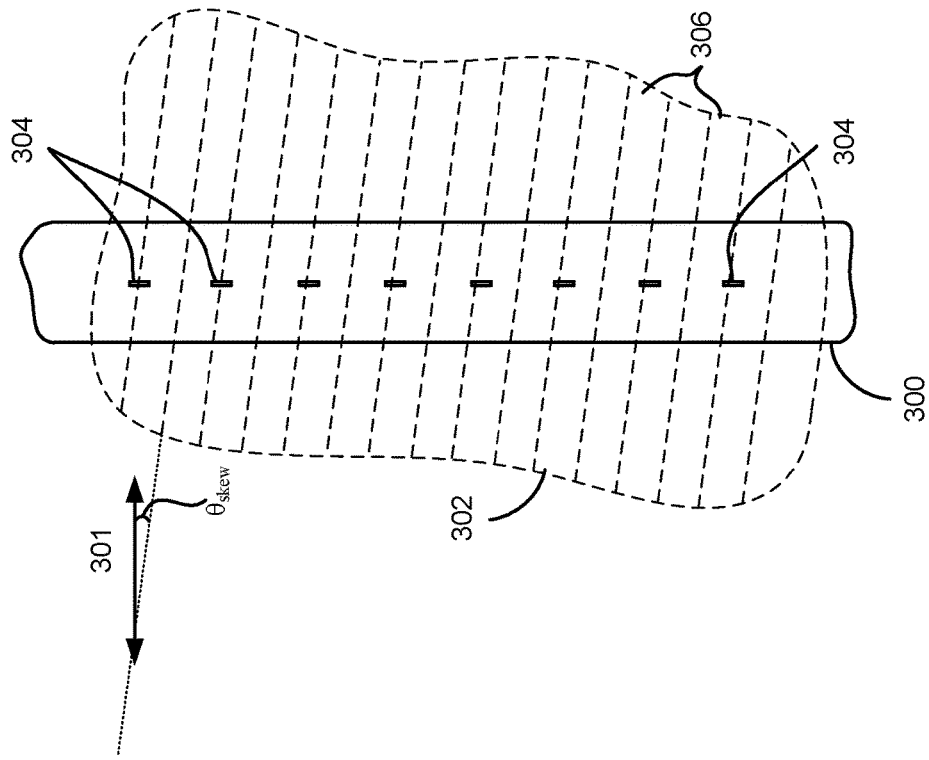
FIGS. 3A-3C are representative drawings showing the effect of tape skew on transducer positions relative thereto.
Figure 3A:
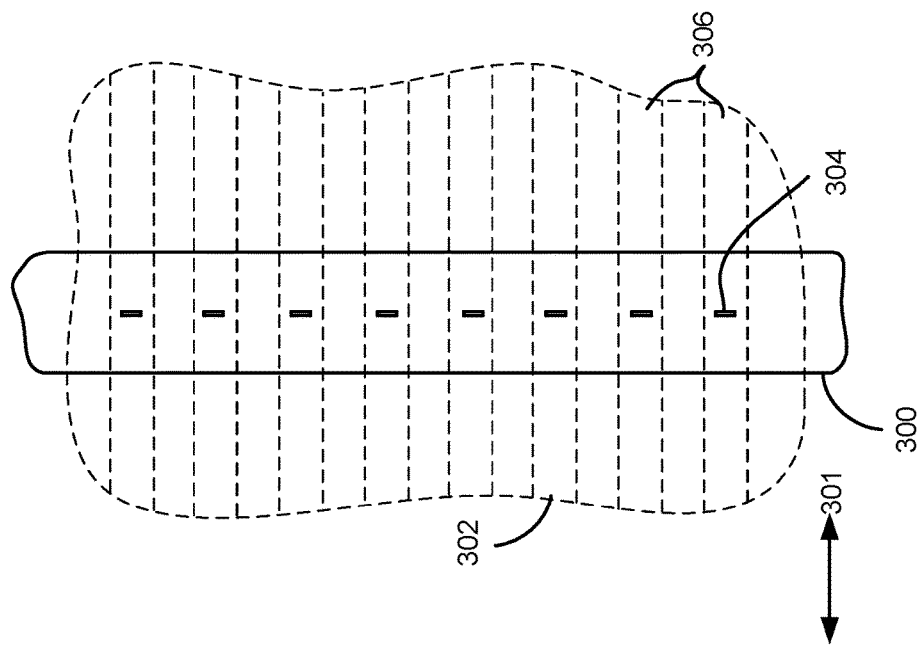
Figure 3C:
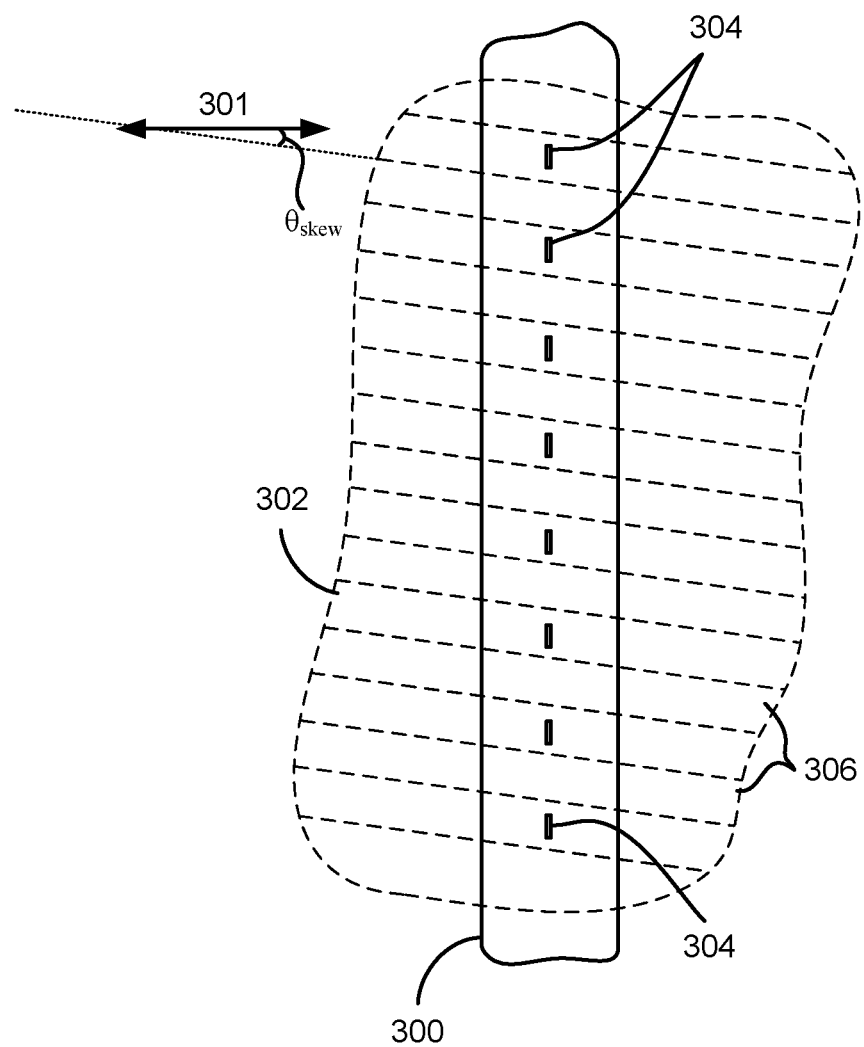

As noted above, tape skew presents challenges to increasing data track density on tape. By way of example, FIGS. 3A-3C represent the effect of tape skew on reader position relative thereto. FIG. 3A shows a head 300 relative to the tape 302, where the tape has a nominal width and is oriented about parallel with the intended direction of tape travel 301. As shown, the readers 304 are aligned with the data tracks 306 on the tape 302. However, FIG. 3B shows the effect of skew. As the tape 302 is skewed, it shifts from an orientation about parallel with the intended direction of tape travel 301 (e.g., as shown in FIG. 3A), to being oriented at a skewed angle $\theta_{skew}$ relative to the intended direction of tape travel 301. As shown, the readers 304 are now positioned along the boundary between the data tracks 306. Depending on the extent and/or direction of skew, the extent of misalignment between the readers and their corresponding data tracks may vary. Moreover, it should be noted that the exaggerated extent of the tape skew illustrated in FIG. 3B is presented for by way of example only, and is in no way intended to limit the invention.

In various embodiments, tape skew may be compensated for by laterally moving the array of transducers, thereby selectively altering the location of the transducers in the array relative to the tape. In one approach to compensate for tape skew, the head may be moved orthogonal to an intended direction of tape travel in order to realign the transducers with the skewed data tracks. Smaller adjustments may be made to keep the project reader span aligned with tracks on the tape. Looking momentarily to FIG. 3C, the head 300 has been moved (e.g., shifted) orthogonal to the intended direction of tape travel 301 in order to realign the readers 304 with the skewed data tracks 306.

This process of shifting of the head to realign the transducers with the skewed data tracks is effective when only one module is used (one row of elements). However, magnetic tape systems generally have two or more modules, each containing a row of transducers, where the additional rows of transducers allow for read verify during the write process. One difficulty in implementing this scheme in a head having multiple arrays, such as for the head in FIGS. 2 and 2C, is that though one array of transducers may be properly aligned with the tracks, the other arrays of transducers may not. Conventional products having more than one module implement a bonding process to fix the modules relative to each other. Currently, this bonding process creates a single movable sub assembly that is attached to a track following actuator typically motivated by a voice coil system. In other words, when the lateral orientation is changed for two or more modules that are fixed relative to each other, it is not possible to keep all elements on track since the other rows of elements will move as well.

The present disclosure describes several embodiments that implement an actuator that creates relative motion between modules and enables lateral shift compensation for tape skew on a multi-module head. Various embodiments described herein may be able to overcome the effects of tape skew on multi-module heads by introducing improved ways of generating fine motion (e.g., micro motion) of a module relative to one or more other modules in the magnetic head. In some embodiments a first module may be coupled to one or more fine motion actuators (e.g., piezoelectric actuators) that enable relative motion of the first module relative to one or more other modules. As a result, greater fine position control of the first module may be achieved, thereby reducing reliance on dynamic skew actuators and improving the overall track following performance, as will be discussed in further detail below.

Figure 4:
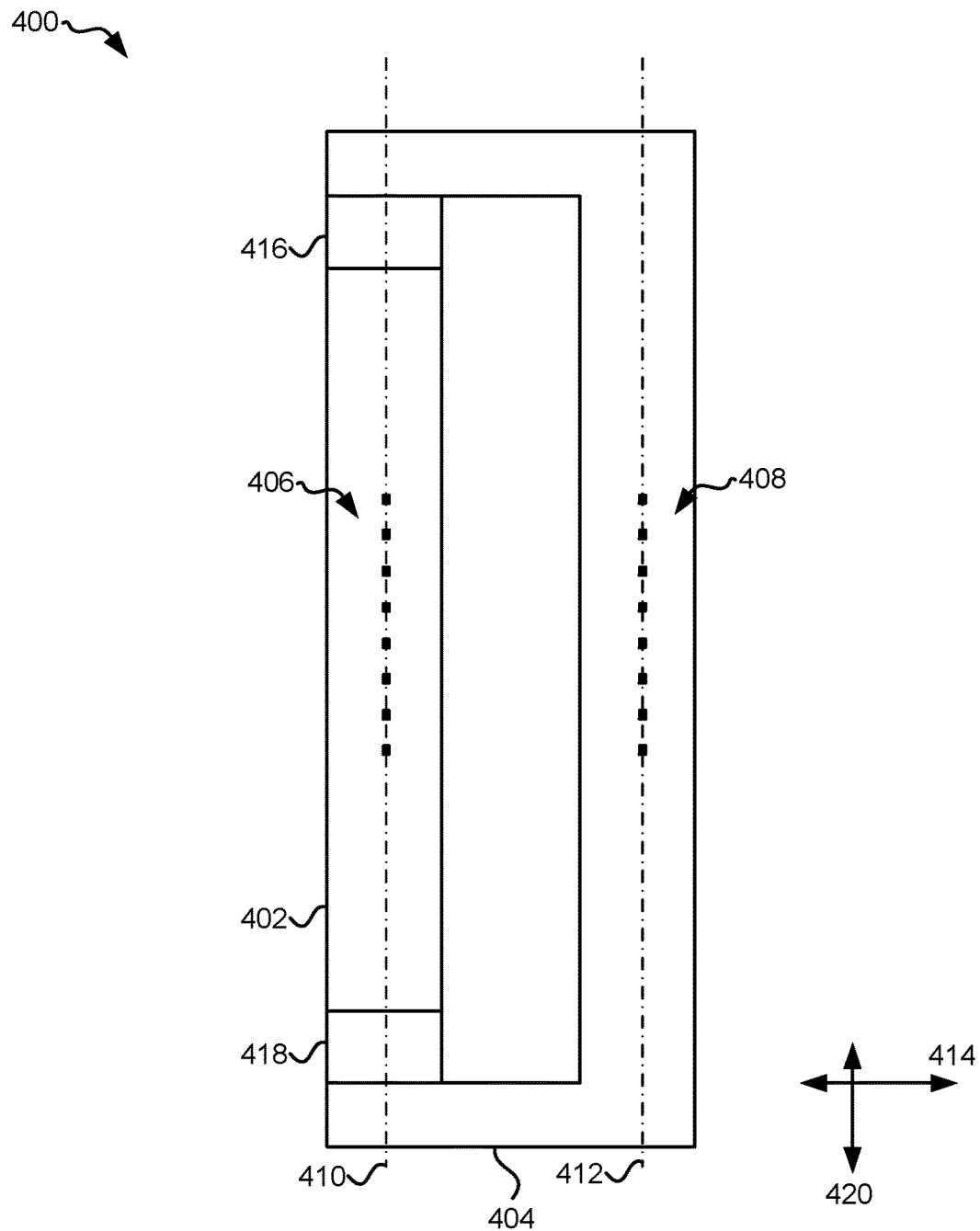
FIG. 4 is a schematic diagram of an apparatus having a two module configuration according to one embodiment.

FIG. 4 depicts an apparatus 400 in accordance with one embodiment. As an option, the present apparatus 400 may be implemented in conjunction with features from any other embodiment listed herein, such as those described with reference to the other FIGS., such as FIG. 1. However, such apparatus 400 and others presented herein may be used in various applications and/or in permutations which may or may not be specifically described in the illustrative embodiments listed herein. Further, the apparatus 400 presented herein may be used in any desired environment. Thus FIG. 4 (and the other FIGS.) may be deemed to include any possible permutation.

Apparatus 400 includes a first module 402 and a second module 404 each having an array of transducers 406, 408 respectively. It is preferred, but in no way required, that one of the transducer arrays includes write transducers while the other of the transducer arrays includes read transducers, e.g., to enable read verification while writing. In some approaches, both transducer arrays 406, 408 may include stacked pairs of readers and writers, thereby enabling read verification for both directions of tape travel. Moreover, transducer arrays 406, 408 may further include servo readers (e.g., see 212 of FIGS. 2A-2B) for reading data from a servo track. As shown, transducer arrays 406, 408 are oriented such that the longitudinal axes thereof 410, 412 respectively, are about orthogonal to an intended direction of tape travel 414 thereacross. Moreover, the first module 402, the second module 404, or any other module included herein may include any material which would be apparent to one skilled in the art upon reading the present description.

The first and second modules 402, 404 may be selectively positionable such that their lateral position relative to a magnetic tape being passed thereover is controllable. However, it should be noted that the longitudinal axes 410, 412 of the arrays 406, 408 of the first and second modules 402, 404 are, in a preferred embodiment, not pivotable from a position that is about orthogonal to the intended direction of tape travel 414 thereacross. In other words, the first and second modules 402, 404 are preferably oriented such that the longitudinal axes 410, 412 of the transducer arrays 406, 408 are oriented substantially orthogonal (perpendicular) to the intended direction of tape travel. Moreover, the modules 402, 404 are nonrotatably fixed such that they are not able to pivot or rotate from their orientation. This should not be confused with the fact that the angular relationship between the intended direction of tape travel 414 and the longitudinal axes 410, 412 of the arrays 406, 408 will not change, as tape skew may occur regardless of the fact that the first and second modules 402, 404 may be nonrotatably fixed (e.g., see FIG. 3B). Thus, as tape is run across a magnetic head or module thereof, the actual direction of tape travel may skew relative to the intended direction of tape travel 414, thereby creating an angular shift of the tape itself relative to the modules. However, this is not caused by any angular rotation of the modules themselves, as longitudinal axes 410, 412 of the first and second modules 402, 404 respectively, again, are preferably not pivotable from an intended orientation, e.g., an orientation that is about orthogonal to the intended direction of tape travel 414 thereacross.

Despite being nonrotatably fixed, the modules 402, 404 may move laterally in a cross-track direction 420 perpendicular to the intended direction of tape travel 414. As mentioned above, tape skew may cause the individual transducers in arrays of transducers to become misaligned with the data tracks on the tape (e.g., see FIG. 3B above). However, by laterally shifting an array of transducers, the transducers may become realigned with the skewed data tracks on the tape (e.g., see FIG. 3C above). In one approach, first and second modules 402, 404 may be coupled to an actuator used to control the position of the modules 402, 404 together relative to the tape (e.g., see 132 of FIG. 1). An actuator, e.g., such as a conventional voice coil motor (VCM), may cause movement of the modules 402, 404 in the cross-track direction 420 (e.g., the allowed direction of movement) by exerting a force on both modules 402, 404. In one approach, the actuator may be coupled to the second module 404 at or near ends of the module, e.g., via an adhesive, pins, solder, etc. Illustrative actuators include worm screws, voice coil actuators, piezoelectric actuators, etc. alone or in combinations of actuators (e.g., a worm screw for coarse actuation and a voice coil actuator for track following).

With continued reference to FIG. 4, the first and second modules 402, 404 may also be laterally positionable relative to each other. As previously mentioned, as two or more arrays of transducers are laterally shifted to compensate for the tape skew in conventional systems, only one array of transducers may be properly aligned with the tracks of the skewed tape at a time, while the other arrays remain misaligned. In other words, when the same lateral shift is applied to two adjacent modules that are fixed relative to each other, it has heretofore not been possible to keep all elements on track without rotating the modules.

In sharp contrast, the first module 402 and corresponding array of transducers 406 are preferably movable, relative to the second module 404 and corresponding array of transducers 408, in the cross-track direction 420 perpendicular to the intended direction of tape travel 414. Therefore, the lateral position of the modules 402, 404 may be adjusted in the cross-track direction 420 jointly and/or separately such that both arrays of transducers 406, 408 are aligned with the corresponding tracks on the tape, irrespective of tape skew. However, it should be noted that the first and second modules 402, 404 are movable relative to each other in only one direction of motion, here the cross-track direction 420. Thus, it is preferred that neither of the modules 402, 404 may be rotatable or pivotable in any direction other than the cross-track direction 420 and/or rotated relative to each other. In other words, positions of the two modules 402, 404 are preferably fixed relative to each other in every direction of movement except laterally along the cross-track direction 420. The benefits of such an arrangement may include the elimination of the need for a dynamic skew actuator in a traditional flangeless tape path, thus improving the overall track following performance by removing extra components needed for traditional combined track and skew following.

The result is a lighter and more responsive structure allowing for higher bandwidth and a reduction in overall PES.

In a preferred embodiment, first and second actuators 416, 418 are included to induce a relative lateral motion between the first and second modules 402, 404 in the cross-track direction 420. As shown, the first actuator 416 is coupled to a first end of the first module 402, while the second actuator 418 is coupled to a second end of the first module 402, the second end of the first module being opposite the first end of the first module along the longitudinal axis 410 of the first module 402. Accordingly, first and second actuators 416, 418 are used to couple the first and second modules 402, 404 together. In other words, first and second actuators 416, 418 are each sandwiched between the first and second actuators 416, 418.

Each of the actuators 416, 418 may be configured to exert a force on the first and/or second module 402, 404 for causing a relative movement of the first module 402 with respect to the second module 404, as will be described in further detail below. By causing a relative movement of the first module 402 with respect to the second module 404, actuators 416, 418 may be able to align the array of transducers 406 of the first module with the array of transducers 408 of the second module 404 in the direction of tape travel thereacross 414 despite the presence of tape skew.

Referring momentarily to the representational diagram 500 of FIGS. 5A-5B, the effect of implementing relative lateral motion between two modules having arrays of transducers is illustrated. As shown in FIG. 5A, tape 501 is skewed at a skew angle $\theta_{skew}$ relative to the intended direction of tape travel 514. Although transducers 505 of module 504 have remained aligned with the data tracks 506 on the tape 501, transducers 503 of module 502 are not aligned with the data tracks 506 due to the skew of the tape 501. Accordingly, looking to FIG. 5B, by laterally shifting module 502 in the cross-track direction 520 relative to module 504 by a distance D, transducers 503 of module 502 are realigned with the data tracks 506 of tape 501. It follows that the amount by which the modules are laterally shifted relative to each other may depend on the amount of tape skew, the capabilities of the actuators used to cause the lateral shifting, an amount of separation between the modules in the intended direction of tape travel, etc.

Referring again to FIG. 4, the actuators 416, 418 may be piezoelectric actuators incorporating a material of a type known in the art, e.g., such as shape memory alloys, bi-metallic strips, piezoelectric materials, etc. For example, one or both of the actuators 416, 418 may be made of piezoelectric material such as Lead Zirconate Titanate (PZT), or comprise multiple cells of piezoelectric material. In some approaches, one or both of the actuators 416, 418 may be piezoelectric stack actuators. Piezoelectric stacks are subassemblies of piezoelectric materials stacked in a configuration such that when energized by a voltage, expand or contract in the stack height direction. The stack configuration is desirable as the amount of motion per unit of voltage, or electrical charge, applied is amplified as a function of the number of layers used in the stack. Moreover, the mass of the piezoelectric stacks is relatively light, and shapes of the piezoelectric stacks are relatively simple, thus providing a simplified manner in which skew following, or improved track following while reading, can be achieved.

Figure 6A:
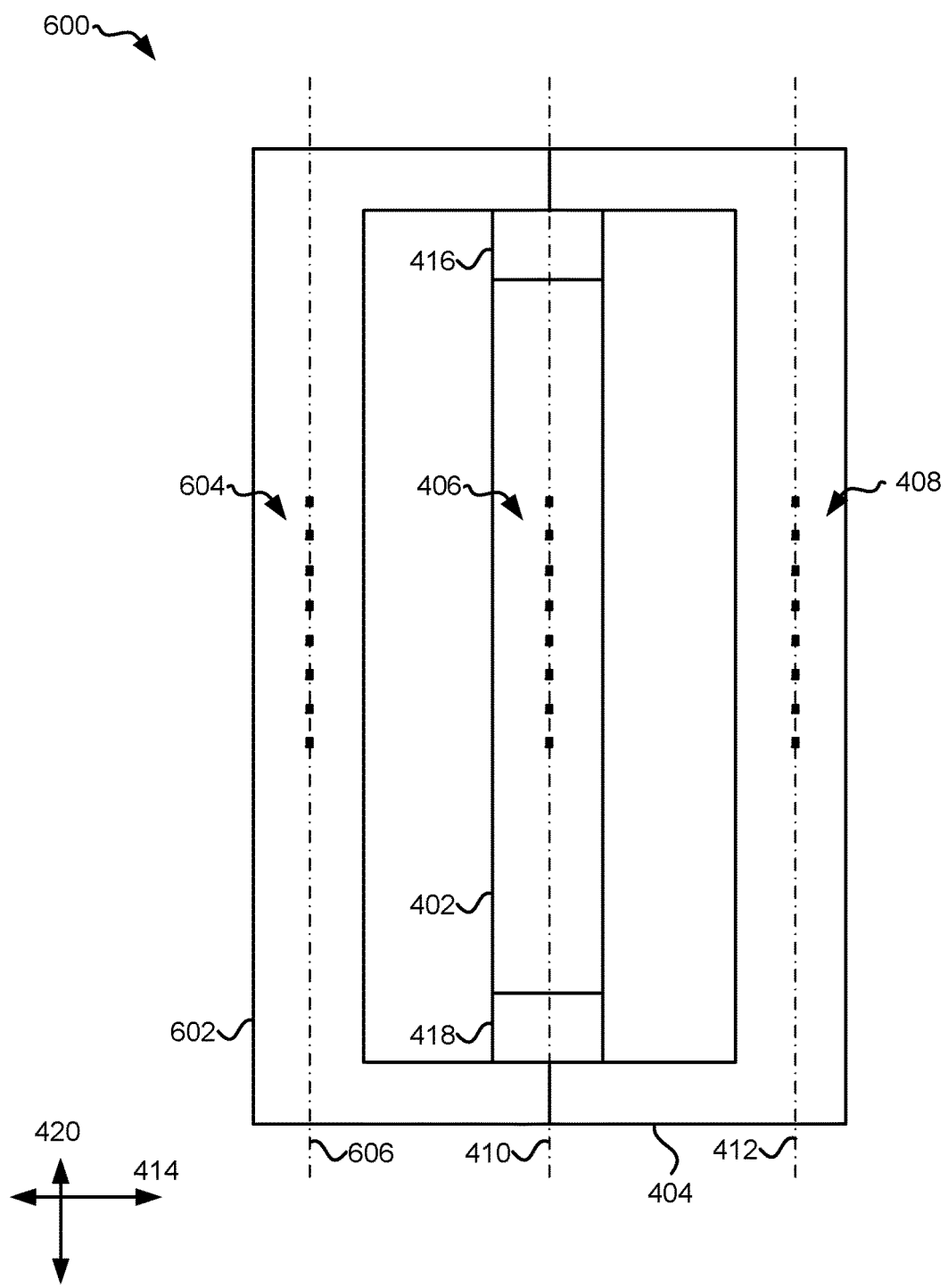
FIG. 6A is a schematic diagram of an apparatus having a three module configuration according to one embodiment.
Figure 6B:
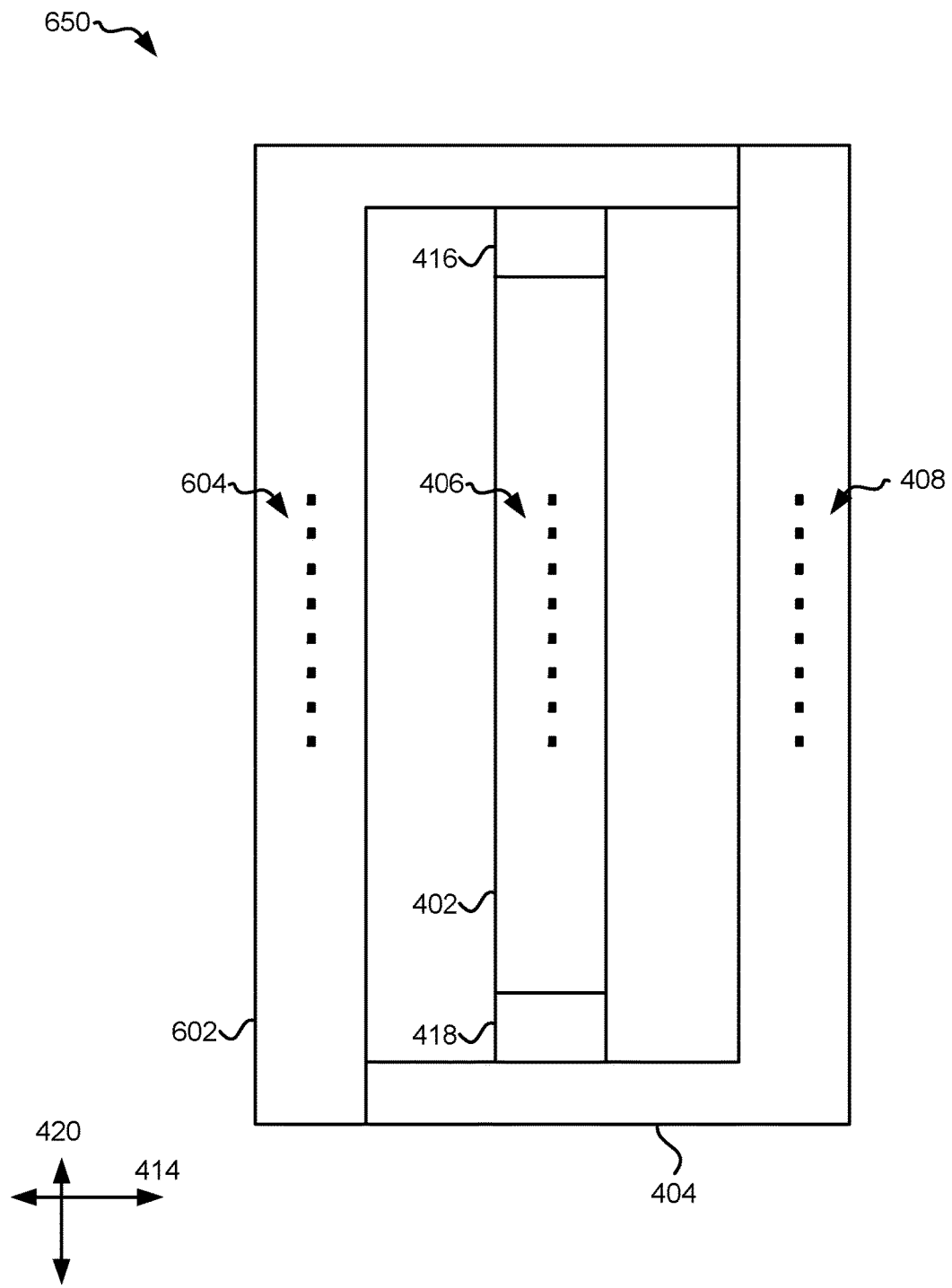
FIG. 6B is a schematic diagram of an apparatus having a three module configuration according to one embodiment.

In another approach, one or more of the actuators 406, 418 may include a thermal actuator. Placing the coupling closer to the end will allow for the greatest amount of motion using a thermal actuator. In one approach, the actuator includes a rigid body coupled to the two modules 402, 404. The beam may be constructed of aluminum or other material with a coefficient of thermal expansion suitable for generating the desired expansion and/or contraction thereof. The temperature of all or a portion of the actuator may be adjusted to induce the expansion and/or contraction thereof. The body may be heated via any suitable mechanism, including resistive (Joule) heating of the body itself or of a heating element coupled thereto, inductive heating, laser-induced heating, etc. The body may be cooled via any suitable mechanism, including by a Peltier device, by reducing or terminating application of heat thereto, ambient air flow, etc. When the body is heated, the thermal expansion creates a force that creates a relative movement between the modules 402, 404 along the cross-track direction 420. In another embodiment, a similar actuator concept may be applied to a three module configuration, e.g., such as the apparatus as shown in FIGS. 6A-6B below.

Alignments may be set using precision translation stages. According to one embodiment alignment adjustments may be made using a precision optical encoder stage. According to another embodiment, alignment adjustments may be made using a piezo actuator, e.g., for very finite adjustments during track following.

The finiteness of precision translation stages may vary according to the embodiment. According to one approach, the precision translation stages may have at least a 10 nm resolution. According to another approach, the precision translation stages may have at least an 8 nm resolution.

Such adjustments may be performed as a magnetic recording tape is passed over the modules, where the alignment of the module 402, 404 may be adjusted to achieve the desired position relative to the tape based on servo-based positioning information derived from servo reader signals of each array 406, 408. The drive controller may control the various actuators to keep each array 406, 408 at the respective desired position relative to one another and the tape.

As mentioned above, each of the actuators 416, 418 may be configured to exert a force on the first and/or second module 402, 404 for causing a relative movement of the first module 402 with respect to the second module 404. Where piezoelectric actuators are used, a voltage is applied to the actuators 416, 418 to create relative motion between the modules 402, 404. According to one approach, the first and second actuators 416, 418 may be oppositely polarized such that they effectively work in cooperation with one another. Thus, the same electrical signal may be sent to the first and second actuators 416, 418 (e.g., from a controller), but because the actuators 416, 418 are oppositely polarized, the same electrical signal may cause one of the actuators 416, 418 to expand while causing the other to contract. For example, in order to move the first module 402 in an upward direction relative to the second module 404, the upper piezoelectric stack can be energized to contract in the vertical direction, while the lower piezoelectric stack can be energized to expand along the same direction. By being oppositely polarized as such, the actuators 416, 418 may effectively act compoundly to cause lateral motion of the first module 402 relative to the second module 404.

The actuators 416, 418 may also be configured to operate in combination with a conventional track following actuator (e.g., VCM) used to cause movement of the modules 402, 404 together as a whole in the cross-track direction 420, e.g., to compensate for lateral tape motion. Thus, if a VCM is laterally shifting both modules 402, 404 in a given direction along the cross-track direction 420, that shifting motion may be factored into the voltage applied to the actuators 416, 418, e.g., to ensure accurate performance of the apparatus as a whole. As a result, the apparatus 400 may be able to successfully compensate for lateral tape motion as well as tape skew concurrently. For example, the first module 402 may be moved relative to the second module 404 by expanding and/or contracting the actuators 416, 418 in the same direction as the VCM during a read or write operation.

As previously mentioned, a VCM actuator for track following may only be coupled to the second module 404, while actuators 416, 418 couple the first module 402 to the second module 404. Thus, a VCM actuator is able to position the first and second modules 402, 404 together by exerting a force on the second module 404 which is coupled to the first module 402, while actuators 416, 418 further enable making fine adjustments to the position of the first module 402 with respect to the second module 404 and the tape, e.g., to compensate for tape skew.

The actuators 416, 418 may further be coupled to a controller (e.g., see 128 of FIG. 1). The controller may be configured to control the actuators 416, 418 to compensate for tape skew based on a readback signal of the tape (e.g., see method 700 of FIG. 7 below). Accordingly, the controller may regulate the output of the actuators 416, 418 as tape is being run over the modules 402, 404, as would be appreciated by one skilled in the art upon reading the present description. By implementing actuators (e.g., piezoelectric actuators) that allow for relative fine motion of a first module relative to at least one other module according to any of the embodiments included herein, micro actuation between modules may be achieved, thereby allowing for improved fine position control thereof. Benefits may include the elimination of the need for a dynamic skew actuator in a traditional flangeless tape path thus improving the overall track following performance by removing extra components needed for traditional track and skew following. The result may be a lighter and more responsive structure allowing for higher bandwidth and a reduction in the overall position error signal (PES).

Although the embodiment depicted in FIG. 4 includes two actuators 416, 418, only one actuator may be present and/or active. In one approach, a single actuator may be used to couple one end of the first module 402 to the second module 404 while a resiliently deformable component (e.g., spring, flexor, resiliently deformable material, piston, etc.) is used to couple the opposite end of the first module 402 to the second module 404. Thus, as the single actuator expands and/or contracts to induce relative lateral motion between the modules 402, 404, the resiliently deformable component is able to maintain a connection between the first and second modules 402, 404 without impeding the actuator.

Similarly, although the embodiment depicted in FIG. 4 includes only two modules 402, 404, an apparatus may have additional modules in other embodiments. For example, turning now to FIG. 6A, an apparatus 600 is shown having three modules, in accordance with one embodiment. As an option, the present apparatus 600 may be implemented in conjunction with features from any other embodiment listed herein, such as those described with reference to the other FIGS., such as FIG. 4. Specifically, FIG. 6A illustrates variations of the embodiment of FIG. 4 depicting several exemplary configurations within an apparatus 600. Accordingly, various components of FIG. 6A have common numbering with those of FIG. 4.

However, such apparatus 600 and others presented herein may be used in various applications and/or in permutations which may or may not be specifically described in the illustrative embodiments listed herein. Further, the apparatus 600 presented herein may be used in any desired environment. Thus FIG. 6A (and the other FIGS.) may be deemed to include any possible permutation.

Apparatus 600 includes first, second and third modules 402, 404, 602, each having an array of transducers 406, 408, 604 oriented along a longitudinal axis 410, 412, 606 of each of the respective modules. As shown the third module 602 is positioned on an opposite side of the first module 402 relative to the second module 404. The second and third modules 404, 602 may be fixed relative to each other, e.g., using an adhesive, fasteners, brackets, etc. Thus, relative motion between the second and third modules 404, 602 is not achievable. Moreover, a first actuator 416 couples a first end of the first module 402 to the second and third modules 404, 602, while a second actuator 418 couples a second end of the first module 402 to the second and third modules 404, 602. Thus, first and second actuators 416, 418 are positioned on opposite ends of the first module 402 along the longitudinal axis 410 thereof. It should be noted that although both the first and second actuators 416, 418 are shown as being in direct physical contact with the second and third modules 404, 602, in other approaches the first and/or second actuator 416, 418 may only be in direct physical contact with one of the second and third modules 404, 602. In further approaches, only one of the actuators 416, 418 may be present.

As mentioned above, the second and third modules 404, 602 may be fixed relative to each other. Thus, the first and/or second actuator 416, 418 need not be in direct physical contact with both of the second and third modules 404, 602 in order to exert a force on the modules 402, 404, 602 for causing a relative movement of the first module 402 with respect to the second and third modules 404, 602. According to an example, apparatus 650 of FIG. 6B illustrates an embodiment in which the first actuator 416 is only in direct physical contact with the third module 602, while the second actuator 418 is only in direct physical contact with the second module 404.

Again, it is preferred that the modules 402, 404, 602 are nonrotatably fixed such that they are not able to pivot from their position relative to the intended direction of tape travel 414. However, despite being nonrotatably fixed, the modules 402, 404, 602 may move laterally in a cross-track direction 420 perpendicular to the intended direction of tape travel 414. In one approach, first, second and third modules 402, 404, 602 may be coupled to an actuator used to control the position of the modules 402, 404, 602 as a single unit relative to the tape (e.g., see 132 of FIG. 1). By laterally shifting the arrays of transducers included on the modules 402, 404, 602, the transducers of one of the modules may become realigned with skewed data tracks on a skewed tape (e.g., see FIG. 3C above).

Referring still to FIG. 6A, the first module 402 may also be laterally positionable relative to the second and third modules 404, 602 using the actuators 416, 418. As previously mentioned, the first and second actuators 416, 418 may be piezoelectric actuators of a type known in the art, e.g., such as piezoelectric stack actuators. Moreover, each of the actuators 416, 418 may be configured to exert a force on the first and/or second and/or third modules 402, 404, 602 for causing a relative movement of the first module 402 with respect to the second and third modules 404, 602. The relative movement of the module 402 with respect to the second and third modules 404, 602 is preferably able to align the transducers of the first module 402 with the transducers of the second and/or third modules 404, 602 in an actual direction of tape travel 414 thereacross. However, the relative movement of the first module 402 with respect to the second and third modules 404, 602 is only in one direction of motion along the cross-track direction.

It should be noted that the transducers on the first module 402 may be aligned with the transducers of the second module 404 or the transducers of the third module 602, depending on whether the tape is traveling from right to left, or from left to right along the intended direction of tape travel 414. The type of transducers (e.g., readers or writers) that are included on each of the modules may also have an effect on whether the transducers of the first module 402 are aligned with those of the second module 404 or those of the third module 602 for a given direction of tape travel. According to an example, which is in no way intended to limit the invention, the transducers on the first module 402 may be write transducers while the transducers on the second and third modules 404, 602 are read transducers (e.g., a read-write-read configuration). Thus, in order to achieve read verification while writing, it is preferred that the transducers of a trailing module are aligned with the transducers of the first module 402. It follows that if the tape were traveling from left to right along the intended direction of tape travel 414, the transducers of the first module 402 would preferably be aligned with the transducers of the second module 404. Alternatively, if the transducers on the first module 402 were read transducers while the transducers on the second and third modules 404, 602 were write transducers (e.g., write-read-write configuration), it is preferred that the transducers of a leading module are aligned with the transducers of the first module 402 in order to enable read verification while writing. It follows that if the tape were traveling from left to right along the intended direction of tape travel 414, the transducers of the first module 402 would preferably be aligned with the transducers of the third module 602.

It should be noted that although the embodiments depicted in FIGS. 6A-6B show the center module (first module 402) as being independently positionable relative to the other two outer modules (second and third modules 404, 602), in other embodiments the outer modules may be independently positionable relative to the center module. For instance, the actuators 416, 418 may also be configured to operate in combination with an actuator (e.g., VCM) used to cause movement of the modules 402, 404, 602 together as a single unit in the cross-track direction 420, e.g., to compensate for lateral tape motion, track following, etc. Thus, if a VCM is laterally shifting modules 402, 404, 602 in a given direction along the cross-track direction 420, that shifting motion may be factored into the voltage applied to the actuators 416, 418, e.g., to ensure accurate performance of the apparatus as a whole. As a result, the apparatus 400 may be able to successfully compensate for lateral tape motion as well as tape skew concurrently. According to some embodiments, which are in no way intended to limit the invention, the VCM actuator may only be coupled to the outer second and third modules 404, 602 while actuators 416, 418 couple the first module 402 to the second and third modules 404, 602. Thus, a VCM actuator may be able to position the first, second and third modules 402, 404, 602 together by exerting a force on the second and third modules 404, 602 which are coupled to the first module 402, while actuators 416, 418 further enable making fine adjustments to the position of the first module 402 with respect to the second and third modules 404, 602, as well as the tape. However, in other embodiments, the VCM actuator may only be coupled to the center first module 402 while actuators 416, 418 couple the second and third modules 404, 602 to the first module 402. Thus, a VCM actuator may be able to position the first, second and third modules 402, 404, 602 together by exerting a force on the first module 402 which is coupled to the second and third modules 404, 602, while actuators 416, 418 further enable making fine adjustments to the position of the second and third modules 404, 602 with respect to the first module 402, as well as the tape.

As previously mentioned, the first and second actuators 416, 418 may be oppositely polarized such that they effectively work in unison. For example, the same electrical signal may be sent to the first and second actuators 416, 418 (e.g., from a controller), but because the actuators 416, 418 are oppositely polarized, the same electrical signal may cause one of the actuators 416, 418 to expand while causing the other to contract. Thus, the actuators 416, 418 may effectively act in concert with one another to cause lateral motion of the first module 402 relative to the second module 404. The actuators 416, 418 may further be coupled to a controller (e.g., see 128 of FIG. 1) that is configured to control the actuators 416, 418 to compensate for tape skew based on a readback signal of the tape. Accordingly, the controller may regulate the output of the actuators 416, 418 as tape is being run over the modules 402, 404 as would be appreciated by one skilled in the art upon reading the present description.

Figure 7:
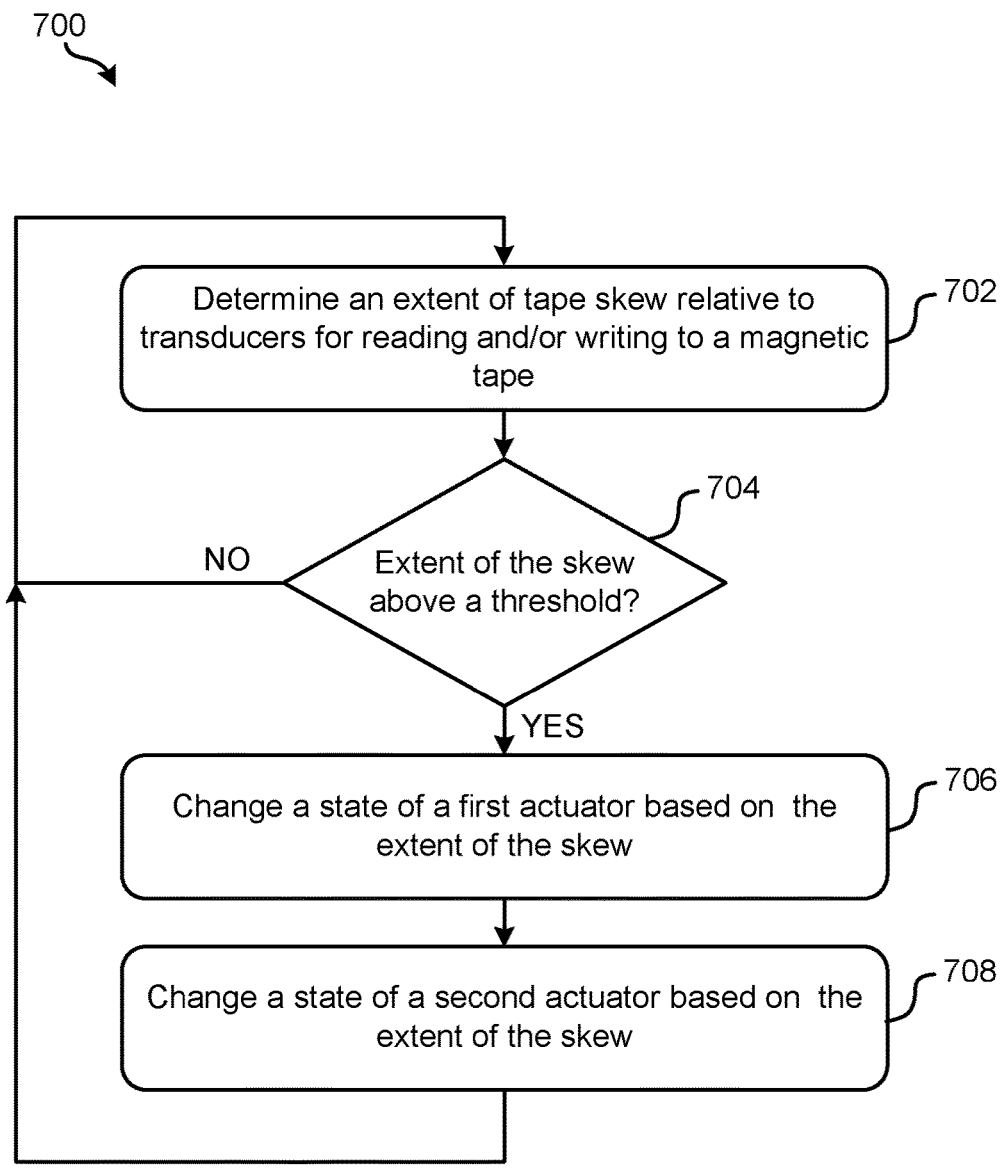
FIG. 7 is a flowchart of a method according to one embodiment.

Now referring to FIG. 7, a flowchart of a computer-implemented method 700 is shown according to one embodiment. The method 700 may be performed in accordance with the present invention in any of the environments depicted in FIGS. 1-6B, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 includes determining an extent of tape skew relative to transducers for reading and/or writing to a magnetic tape. See operation 702. The transducers may be positioned in any number of arrays on any number of modules of a magnetic head, e.g., according to any of the embodiments described and/or suggested herein. Moreover, the extent of tape skew may be determined using any process which would be apparent to one skilled in the art upon reading the present description. For example, the extent of tape skew may be determined by evaluating a readback signal of the tape. According to another example, the extent of tape skew may be determined by using servo readers to read servo tracks on the tape.

Furthermore, decision 704 includes determining whether the extent of the skew is above a threshold. Depending on the approach, the threshold may be preset, selected by a user, updated based on drive performance, etc. Although the threshold value itself may vary depending on different factors, it represents an amount of tape skew, above which, data tracks are sufficiently misaligned with the transducers that corrective procedures are to be taken. According to an illustrative approach, the threshold may represent an amount of tape skew which corresponds to the transducers crossing over into adjacent data tracks. Moreover, it should be noted that "above a threshold" is in no way intended to limit the invention. Rather than determining whether a value is above a threshold, equivalent determinations may be made, e.g., as to whether a value is within a predetermined range, whether a value is outside a predetermined range, whether an absolute value is above a threshold, whether a value is below a threshold, etc., depending on the desired approach.

Thus, method 700 proceeds to operation 706 in response to determining that the extent of the skew is above a threshold. As shown, operation 706 includes changing a state of a first actuator (e.g., a piezoelectric actuator such as a piezoelectric stack) based on (e.g., in response to) the extent of the skew determined in operation 702. Moreover, operation 708 includes changing a state of a second actuator (e.g., a piezoelectric actuator such as a piezoelectric stack) based on (e.g., in response to) the extent of the skew determined in operation 702. By changing the state of the actuator as such, operations 706 and 708 may cause a relative movement of the modules for aligning the transducers of the modules to compensate for the tape skew, e.g., according to any of the approaches described herein.

Once operations 706 and 708 have been performed, method 700 returns to operation 702 whereby the extent of tape skew may again be determined. Similarly, method 700 returns to operation 702 from decision 704 in response to determining that that the extent of the skew is not above a threshold. The processes of method 700 may be repeated any number of times and/or with any desired frequency. According to various approaches, method 700 may be performed after a given amount of time has passed, after a certain amount of tape has been run across a head, after a given number of read and/or write errors have occurred, etc. In some approaches, method 700 may continuously be repeated while tape is being run across a magnetic head, e.g., such that tape skew may actively be compensated for during run time to enable improved track following.

It follows that various embodiments described herein present unique ways of generating fine motion (e.g., micro motion) of a module relative to one or more other modules in a magnetic head. By implementing actuators (e.g., piezoelectric actuators) that allow for relative fine motion of a first module relative to at least one other module according to any of the embodiments included herein, micro actuation between modules may be achieved, thereby allowing for improved fine position control thereof. Benefits may include the elimination of the need for a dynamic skew actuator in a traditional flangeless tape path thus improving the overall track following performance by removing extra components needed for traditional track and skew following. Thus, any of the embodiments described herein may not include a pivot point or pin-bearing skew actuator system as would be appreciated by one skilled in the art upon reading the present description. Conventional products typically have a separate mechanism to allow for skew following, thereby including at least one additional VCM assembly and a pivotable system to allow for skew rotation of the head.

By eliminating the pivot point and/or pin-bearing skew actuator, tape skew may be compensated for while reducing the moving mass required to do so by implementing any of the embodiments described and/or suggested herein. Therefore, the embodiments described herein may achieve a lighter and more responsive structure with improved acceleration, allowing for higher bandwidth, reduced response time, and a reduction in the overall PES. Moreover, by providing a system that compensates for tape skew, various embodiments described and/or suggested herein may enable use of wider readers, resulting in a better signal to noise ratio (SNR), and/or smaller data tracks, resulting in a higher capacity per unit area of the media.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus comprising:
a first module and a second module each having an array of transducers oriented orthogonal to an intended direction of tape travel thereacross, wherein the first module is movable relative to the second module;
a first actuator configured to exert a force on one of the modules for causing a relative movement of the first module with respect to the second module for aligning the transducers of the first module with the transducers of the second module in a direction of tape travel thereacross; and
a second actuator,
wherein the second actuator is coupled to a second end of the first module and at least a portion of the second module, the second end of the first module being opposite a first end of the first module along a longitudinal axis of the first module,
wherein the second actuator is positioned entirely between the second end of the first module and the portion of the second module, wherein longitudinal axes of the arrays of the first and second modules are not pivotable from orthogonal to the intended direction of tape travel thereacross.

2. The apparatus as recited in claim 1, wherein the first module is movable relative to the second module in only one direction of motion, wherein the first actuator is configured to exert a force on the modules for causing the relative movement of the first module with respect to the second module.

3. The apparatus as recited in claim 1, comprising a controller configured to control the first actuator to compensate for tape skew based on a readback signal of a tape.

4. The apparatus as recited in claim 1, comprising a third module positioned on an opposite side of the first module relative to the second module.

5. The apparatus as recited in claim 4, wherein the second and third modules are fixed relative to each other.

6. The apparatus as recited in claim 5, wherein the first actuator and the second actuator are both piezoelectric stacks, wherein the first actuator is coupled to the first end of the first module.

7. A data storage system, comprising:
a magnetic head having the modules and the actuators as recited in claim 1;
a drive mechanism for passing a magnetic tape over the magnetic head; and
a controller configured to control the first actuator to compensate for tape skew based on a readback signal of the tape.

8. A computer-implemented method, comprising:
determining an extent of tape skew relative to transducers for reading and/or writing to a magnetic tape, the transducers being positioned in arrays on first, second and third modules of a magnetic head;
changing a state of a first actuator in response to the determined extent of the skew for causing a relative movement of the modules for aligning the transducers of the modules to compensate for the tape skew; and
changing a state of a second actuator in response to the determined extent of the skew for causing the relative movement of the modules for aligning the transducers of the modules to compensate for the tape skew,
wherein the first actuator and the second actuator are both piezoelectric actuators,
wherein the first actuator is coupled to a first end of the first module,
wherein the second actuator is coupled to a second end of the first module, the second end of the first module being opposite the first end of the first module along a longitudinal axis of the first module,
wherein the third module is positioned on an opposite side of the first module relative to the second module,
wherein the second and third modules are fixed relative to each other,
wherein longitudinal axes of the arrays of the modules are not pivotable from orthogonal to an intended direction of tape travel thereacross.

9. The computer-implemented method as recited in claim 8, wherein the first actuator is a piezoelectric stack.

10. The computer-implemented method as recited in claim 8, wherein the magnetic head includes the second actuator, wherein the second actuator is coupled to the second end of the first module and at least a portion of the second module, wherein the second actuator is positioned entirely between the second end of the first module and the portion of the second module.

11. The computer-implemented method as recited in claim 8, wherein the first actuator is configured to exert a force on the first module and at least one of the second and third modules for causing the relative movement of the modules.

12. The computer-implemented method as recited in claim 8, wherein the first module is movable relative to the second and third modules in only one direction of motion, wherein the one direction of motion is about orthogonal to an intended direction of tape travel thereacross, wherein the magnetic head includes the second actuator.

13. A computer program product comprising a computer readable storage medium having program instructions embodied therewith, wherein the computer readable storage medium is not a transitory signal per se, the program instructions readable and/or executable by a processor to cause the processor to perform a method comprising:
determining, by the processor, an extent of tape skew relative to transducers for reading and/or writing to a magnetic tape, the transducers being positioned in arrays on first, second and third modules of a magnetic head; and
changing, by the processor, a state of a first actuator in response to the determined extent of the skew for causing a relative movement of the modules for aligning the transducers of the modules to compensate for the tape skew,
wherein the third module is positioned on an opposite side of the first module relative to the second module,
wherein the second and third modules are fixed relative to each other,
wherein longitudinal axes of the arrays of the modules are not pivotable from orthogonal to an intended direction of tape travel thereacross,
wherein the first actuator is coupled to a first end of the first module,
changing, by the processor, a state of a second actuator in response to the determined extent of the skew for causing the relative movement of the modules for aligning the transducers of the modules to compensate for the tape skew,
wherein the second actuator is coupled to a second end of the first module, the second end of the first module being opposite the first end of the first module along a longitudinal axis of the first module.

14. The computer program product as recited in claim 13, wherein the first actuator is a piezoelectric stack.

15. The computer program product as recited in claim 13, wherein the magnetic head includes the second actuator, wherein the first actuator and the second actuator are both piezoelectric stacks.

16. The computer program product as recited in claim 13, wherein the first actuator is configured to exert a force on the first module and at least one of the second and third modules for causing the relative movement of the modules.

17. The computer program product as recited in claim 13, wherein the first module is movable relative to the second and third modules in only one direction of motion, wherein the one direction of motion is about orthogonal to an intended direction of tape travel thereacross, wherein the magnetic head includes the second actuator, wherein the second actuator is coupled to the second end of the first module and at least a portion of the second module, wherein the second actuator is positioned entirely between the second end of the first module and the second portion of the second module.

* * * * *